United States Patent [19]

Takenaka

[11] Patent Number: 4,931,832
[45] Date of Patent: Jun. 5, 1990

[54] METHOD OF SPECIFYING FRAME NUMBER

[75] Inventor: Yuji Takenaka, Kanagawa, Japan

[73] Assignee: Fuji Photo Film Co., Ltd., Kanagawa, Japan

[21] Appl. No.: 343,641

[22] Filed: Apr. 27, 1989

[30] Foreign Application Priority Data

Apr. 28, 1988 [JP] Japan .................. 63-106106

[51] Int. Cl.$^5$ ...................... G03B 27/32; G03B 27/52
[52] U.S. Cl. ...................................... 355/77; 355/41; 355/50
[58] Field of Search ................. 355/41, 50, 77

[56] References Cited

U.S. PATENT DOCUMENTS

| 4,264,196 | 4/1981 | Von Stein et al. ............ 355/41 |
| 4,671,648 | 6/1987 | Watanabe et al. ............ 355/41 X |
| 4,687,321 | 8/1987 | Itoh ........................... 355/41 |
| 4,693,591 | 9/1987 | Saijo et al. .................. 355/41 |
| 4,806,990 | 2/1989 | Tahara ....................... 355/41 X |
| 4,862,222 | 8/1989 | Staude et al. ............... 355/41 |
| 4,864,149 | 9/1989 | Matsumoto ................. 355/41 X |

Primary Examiner—Richard A. Wintercorn
Attorney, Agent, or Firm—Sughrue, Mion, Zinn, MacPeak & Seas

[57] ABSTRACT

A method of specifying each of the frame numbers of image frames of an elongated photographic film when the film is fed to be positioned in a printing position at which the film is to be subjected to printing. Position specifying areas are set at even intervals in the longitudinal direction of the film in such a manner as to include in the areas frame numbers. The frame number within one of the position specifying areas is specified as the frame number of one of the image frames if the center of the one image frame is present in the one position specifying area. Non-specifying areas which are in the vicinity of the boundaries of the position specifying areas but which do not belong to any of the frame numbers are also set. If the center of one of the image frames is present in one of the non-specifying areas, the number of this image is specified by referring to the frame numbers of the image frames ahead of and behind that one image frame. The method is therefore capable of specifying each of the frame numbers in such a manner that they form a sequence of numbers or a series of symbols that possesses a certain regularity throughout the length of one photographic film.

10 Claims, 4 Drawing Sheets

METHOD OF SPECIFYING FRAME NUMBER

BACKGROUND OF THE INVENTION

1. Field of the Invention

The present invention relates to a method of specifying frame numbers of an elongated photographic film. In the elongated photographic film position specifying areas are evenly set in the longitudinal direction of the film for including therein numbers of image frames recorded on the film at a certain interval in the longitudinal direction. And in the elongated photographic film a frame number within a position specifying area is specified as the frame number of an image frame if the center of the recorded image frame is present in this position specifying area.

2. Related Art

In a photographic film such as a negative, frame numbers are provided in the vicinity of each of the image frames of the film. Bar codes corresponding to the frame numbers are provided in the vicinity of the frame numbers and are designed to be read by a sensor. When one of the bar codes is read by the sensor and the corresponding frame number is specified, one of the image frames is distinguished from others.

Each bar code itself is positioned on the centerline of an area which is specified by the bar code. The area to be specified by the bar code is so called as "a position specifying area" hereinafter. When the center of an image frame is in the area, the frame number of the image frame is determined to be the frame number within that area.

This arrangement will be described with reference to FIG. 4. In the example shown, a negative 50 is a 35 mm film in which image frames are formed by taking photographs and are recorded in full-size. Bar codes 52 are provided at even intervals on the edge portion of the negative 50 on one widthwise side thereof (i.e., on the upper edge portion as viewed in FIG. 4). The bar codes 52 are arranged in the sequence of 0, 0A, 1, 1A, 2, 2A, 3..., from the left side to the right. In this way, the bar codes 52 are provided to be also applicable to half-size image frames. The position specifying area corresponding to each bar code 52 is defined by a range indicated by one-dot chain lines in FIG. 4. If image frames 54 are continuously recorded in full-size, the centers of the image frames 54 are normally present within alternate areas. For instance, the centers are positioned at the positions indicated by marks ▼ and by broken lines in FIG. 4. In the condition shown in FIG. 4, therefore, the numbers of the image frames 54 are specified as 0A, 1A, 2A, . . . from the left. If the negative 50 were set in the camera in a different manner, the numbers of the image frames 54 may be specified as 1, 2, 3, . . . from the left. In either case, the specified frame numbers comprises either integers alone or integers followed by the symbol "A" alone. Thus, the frame numbers are specified in the form of a sequence of numbers or a sequence of numbers followed by symbols and, hence, have a certain regularity which facilitates determination of the front-rear relationship between the frame numbers in the sequence.

When frame numbers have been specified in this manner, they are each printed on the reverse surface of the printed paper, so that the numbers are used to select certain image frames 54 out of those originally provided in the negative 50 when reprints or the like are requested.

The above-described arrangement will encounter no problem when all the centers of the image frames 54 are present at even intervals. However, the position of the centers of the image frames may deviate if there was any variation in the distance by which the film was wound during photography. A similar deviation may result from deviation in the reading position during the reading of the bar codes 52. In such cases, particularly if the centers of the image frames 54 are present in the vicinity of the borders of the areas, the following problem is encountered. For instance, as shown in FIG. 5, the centers of the image frames 54 may be present within the areas corresponding to frame numbers 0, 1A, 2, 3, . . . , from the left (see the positions indicated by marks ▼ and broken lines in FIG. 5). In this way, the frame numbers will lack regularity. With such an irregularity of frame numbers, when the frame numbers corresponding to the bar codes 52 read are printed on the reverse surface of the printing paper, the client may find them to be rather strange. If reprints are requested by the client, it would then be necessary to check all the pieces of printing paper, which is a cumbersome operation.

SUMMARY OF THE INVENTION

In view of the above-described circumstances, it is an object of the present invention to provide a method of specifying a frame number which is capable of specifying each of the frame numbers in such a manner that they are in the form of a sequence of numbers or a series of symbols that possesses a certain regularity throughout the length of one photographic film.

According to the present invention, there is provided a method of specifying each of the frame numbers of an elongated photographic film when the film is fed to be positioned in a printing position at which the film is to be subjected to printing. The method comprises the steps of: reading frame number information means provided on the photographic film; setting position specifying areas at even intervals in the longitudinal direction of the film to include in the areas frame numbers recorded at constant intervals in the longitudinal direction of the film, the frame number within one of the position specifying areas being specified as the frame number of one of the image frames if the center of the one image frame is present in the one position specifying area; and setting non-specifying areas which are in the vicinity of the boundaries of the position specifying areas but which do not belong to any of the frame numbers, the frame number of one of the image frames whose center is present within one of the non-specifying areas being specified by referring to the frame numbers of the image frames ahead of and behind the one image frame.

When photographs have been taken using a 35 mm film and adopting full-size, the centers of the recorded image frames are normally present within alternate position specifying areas. This is because the position specifying areas are set to enable the specifying of the frame numbers also when the image frames are formed by photography using half-size. However, if the centers of the image frames are present in the vicinity of the boundaries of the position specifying ares, and if an image frame whose frame number is to be specified is deviated toward one adjacent image frame, there is a risk that the frame number may be specified in correspondence with continuous position specifying areas.

According to the present invention, non-specifying areas are also set in the vicinity of the boundaries of the position specifying areas. If the center of one of the image frames is present within one of the non-specifying areas, the frame number of this image frame, whose center is within the non-specifying area, is specified on the basis of the frame numbers of the image frames which are ahead of and behind that image frame. Therefore, each of the frame numbers can be specified as each of a series of numbers which possesses a certain regularity.

DESCRIPTION OF THE PREFERRED EMBODIMENT

Figure 1:
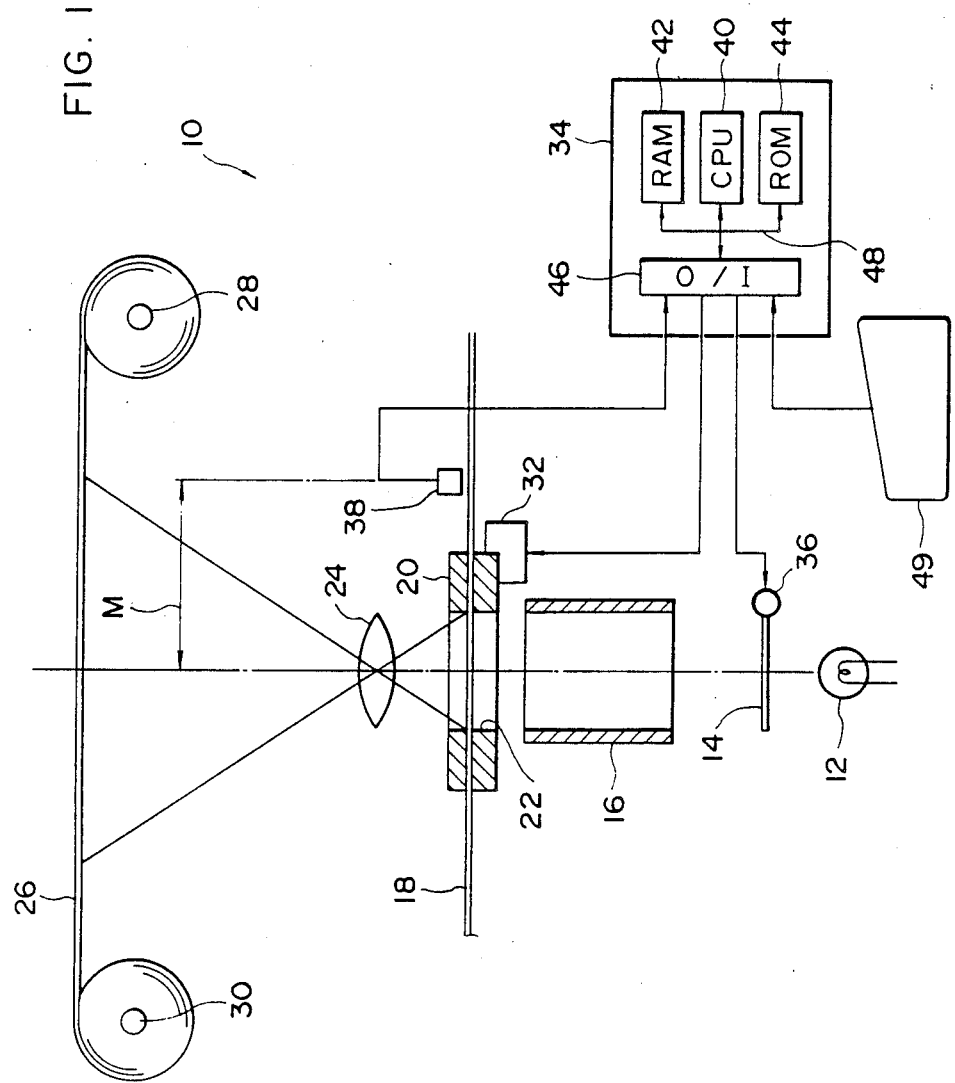
FIG. 1 is a view schematically showing an example of a photographic printer to which one embodiment of the method in accordance with the present invention is applied.

FIG. 1 shows a photograph printer 10 to which the method of the present invention is applied. Light generated from a light source 12 propagates through a filter (not shown), a shutter 14, and a light diffusion cylinder 16 to a 35 mm negative 18 serving as a photographic film. The negative film 18 is elongated in shape and has a plurality of full-size image frames 18B recorded on the negative 18C in the longitudinal direction thereof.

The negative film 18 is held by a negative carrier 20 having an opening 22. When an image frame whose image is to be printed is positioned in the opening 22, the light transmitted through the image frame reaches a lens 24. The image frames 18B of the negative 18 are formed with notches 18C in correspondence therewith. These notches 18C are each detected by a notch detecting sensor (not shown) so that a particular image frame 18B whose image is to be printed can be easily positioned in the printing position. The notches 18C are formed by a notch puncher (not shown) when the negative film !8 is inspected after development.

Light which has transmitted through the lens 24 is radiated on the emulsion surface of printing paper 26, thereby exposing a part of the printing paper 26. End portions of the printing paper 26 are wound in a layered manner on winding rollers 28 and 30. A certain length of the printing paper 26 is wound out from the roller 28 and wound onto the roller 30 each time an intermediate part has been exposed to the light transmitted through one image.

The negative carrier 20 is equipped with a drive apparatus 32 for feeding the negative film 18. The drive apparatus 32 is connected to a controller 34 and driven by a signal supplied therefrom. The drive apparatus 32 comprises a pulse motor (not shown). When the number of feed pulses for the pulse motor is controlled, the feeding of the negative 18 can be controlled. The shutter 14 is also connected to the controller 34 via a driver 36 in such a manner as to be opened for a predetermined period of time during printing.

A positional information detecting sensor 38 is provided upstream of the negative carrier 20 for reading bar codes 18A (see FIG. 2) provided on the negative film 18 as the negative film 18 is being fed. The positional information detecting sensor 38 is disposed in correspondence with the longitudinal direction of bars forming the bar codes 18A. Specifically, the sensor 38 is so designed as to be able to detect, in the vicinity of the two longitudinal ends of the bars of bar codes 18A, a bar of a bar code 18A if there is any. When a bar of a bar code 18A has been read by the positional information detecting sensor 38, corresponding data is supplied to the controller 34.

The controller 34 includes a CPU 40, a RAM 42, a ROM 44, an input output port (I/O) 46, and buses 48 connecting these members and including data buses and control buses. Signal lines from the driver 36 for the shutter 14, the drive apparatus 32, and the positional information detecting sensor 38 are each connected to the I/O 46. A keyboard 49 is also connected to the I/O 46.

Figure 2:
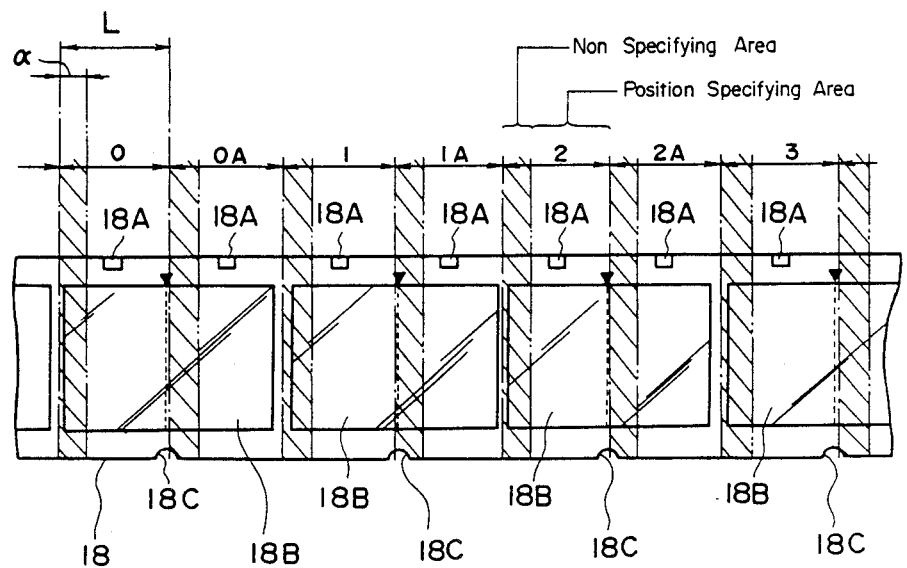
FIG. 2 is a plan view of a negative, showing a state in which frame numbers are specified in the embodiment of the present invention.

Referring to FIG. 2, the bar codes 18A are provided on the negative 18 and at a pitch of 19 mm in the longitudinal direction of the film 18. The positional information detecting sensor 38 is provided in correspondence with the locus of movement of the bar codes 18A.

The bar codes 18A correspond to the image frame numbers. When one of the bar codes 18A is read by the positional information detecting sensor 38, it is possible to specify, on the basis of the resultant data, a particular frame number which corresponds to the bar code 18A. With this arrangement, therefore, in order to locate the image frame 18B having the frame number designated through the keyboard 49, the frame number based on the data read by the position information detecting sensor 38 is compared with the designated frame number. The frame numbers are arranged in a predetermined sequence, for instance, in the order of 0, 0A, 1, 1A, 2, 2A, 3, . . . .

The positional information detecting sensor 38 is distant from the printing position by a distance M=38 mm x N (N being an integer). With this distance, there is actually a certain time lag between the time point at which a bar code 18A is read and the time point at which an image frame 18B corresponding in position to the bar code 18A is stopped at the printing position. However, if the arrangement of the bar codes 18A is such that a bar code 18A which has just been read corresponds in data to an image frame 18B which is in the state of having been moved over a distance corresponding to an integer N number of image frames 18B, the result is substantially the same as the arrangement where a bar code 18A is read at the printing position. Therefore, the following descriptions will be given assuming that the position at which a bar code 18A is read is the same as the center of the printing position.

According to this embodiment, the center of an image frame 18B is recognized in order to specify the frame number thereof, and the recognition is made on the basis of the distance which the image frame 18A is moved after the positional information detecting sensor 38 has read the bar code 18A corresponding to the image frame 18B until the image frame 18B is positioned in the printing position. This is for the following reason. The relative position of the bar codes 18A with respect to the corresponding image frames 18B varies in accordance with the manner in which the film 18 was set in the camera during photography. Accordingly, the timing at which each bar code 18A is read deviates form the timing at which the corresponding image frame 18B is positioned in the printing position and by an amount which varies each time. The amount of deviation is determined on the basis of the distance which the negative film 18 is fed and using as the reference the center of each image, frame 18. The feeding distance can be easily obtained by counting the number of pulses for the pulse motor used in the drive apparatus 32.

According to this embodiment, already set in the film 18 are certain areas (position specifying areas) of the film 18 each of which is specified by one of the bar codes 18A. The position specifying areas have a dimension L (the dimension thereof in the longitudinal direction of the film 18) which is expressed as 19 mm−α. A non-specifying area (having the dimension α) is set between two adjacent position specifying areas (See the hatched portions in FIG. 2).

Figure 4:
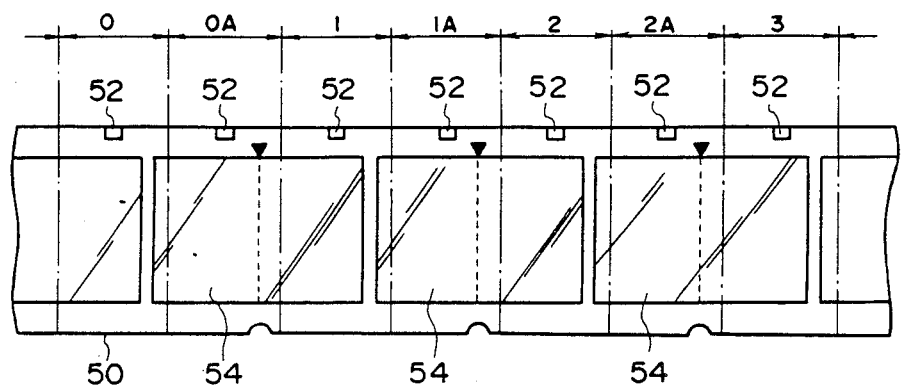
FIGS. 4 and 5 are plan views of negatives, showing states in which frame numbers are specified by the conventional method.
Figure 5:
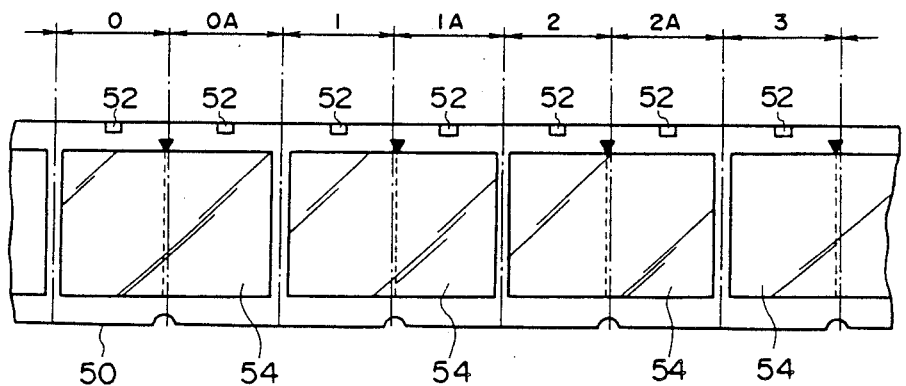

By virtue of the setting of these areas, the bar codes 18A are used to specify each of the frame numbers of the image frames 18B. That is, this specifying is performed by making determination as to in which of the areas the centers (indicated by the marks ▼ and the broken lines in FIG. 2) of the image frames 18B are present. If the image frames 18B are formed by photography using full-size, as in this embodiment, and simultaneously if they are arranged at an even pitch, the centers of the image frames 18B are present within alternate position specifying areas (in a manner similar to that shown in FIG. 4) or within alternate non-specifying areas. If such is the case, the frame numbers are specified in the form of a sequence of numbers which comprises integers alone (i.e., an n series), such as 0, 1, 2, . . . , or in the form of a sequence of numbers which comprises integers always followed by the symbol A (i.e., an nA series), such as 0A, 1A, 2A, . . . . In this way, the frame numbers specified can have a certain regularity. If all the centers of the image frames 18B are present in the non-specifying areas, the type of the sequence which the specified frame numbers will form is selected from among the above-described types.

If the pitch at which the image frames 18B are arranged varies due to variations in the winding distance during the photography by the camera, the relationship between the position of the centers of the image frames 18B and the areas may be such that while some of the centers are present in position specifying areas, others are present in non-specifying areas. If such is the case, certain arrangements are made so that the frame numbers of the image frames 18B whose centers are present in the non-specifying areas will have a certain regularity in compliance with the sequence of numbers formed by the frame numbers of the image frames 18B whose centers are present in the position specifying areas. Also in this case, the frame number of each image frame 18B whose center is in the non-specifying area is specified on the basis of the frame numbers of the image frames 18B which is ahead of and behind such an image frame 18B.

The operation of this embodiment will now be described.

The negative film 18 is fed by the drive apparatus 32 in accordance with predetermined feed pulses, and each of the notches 18C is detected with respect to each image frame 18B to position each of the image frames 18B in the printing position at which printing operations are effected on the printing paper. During this printing, the bar codes 18A are read by the positional information detecting sensor 38 in the same order as printing operations are effected.

Figure 3:
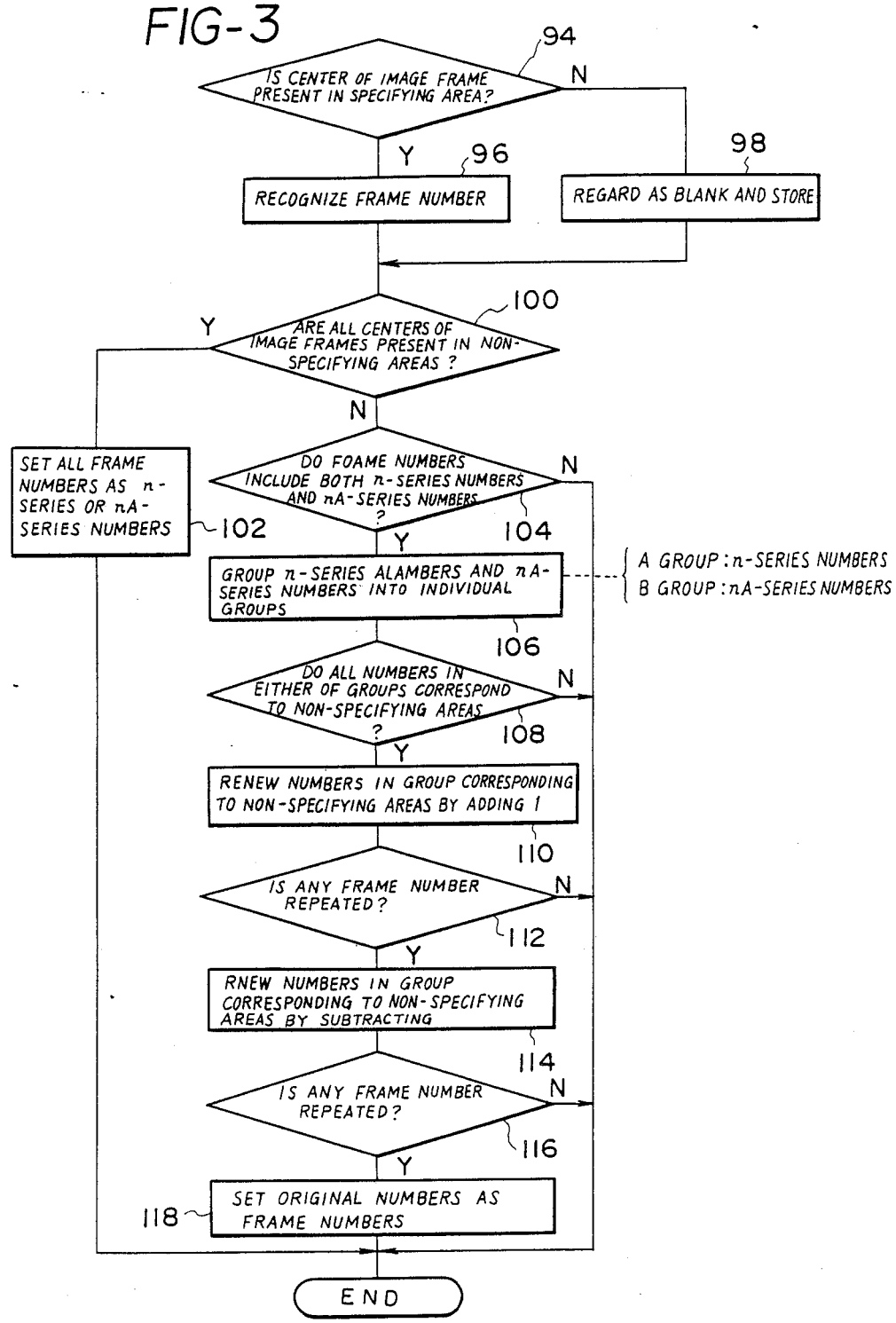
FIG. 3 is a view showing a control flowchart for specifying frame numbers.

Referring to FIG. 3, the routine for specifying the frame numbers will be described. First, at Step 94, it is determined whether or not the center of the image frame 18B is present within a position specifying area. If the answer is affirmative, Step 96 is executed in which the frame number of the image frame 18B is recognized. If any of the bar codes 18A is present within a non-specifying area, i.e., if the center is not present within a position specifying area, it is regarded as a blank and is stored at Step 98.

The stored frame numbers of the image frame are printed on the printing paper 26 which has been subjected to printing. At this time, according to the present invention, an arrangement is provided in which it is determined whether or not the frame numbers corresponding to the read bar codes 18A are in compliance with a predetermined regularity. Also, the frame numbers are corrected in such a manner as to form a sequence of numbers which does not include both numbers forming an n series and numbers forming an nA series, if this is possible. That is, if the center of an image frame 18B is determined to be present in a non-specifying area due, for instance, to the state in which the negative 18 was set in the camera during photography, the frame number remains unspecified and is stored as a blank. In this case, therefore, the frame number has to be set to a number belonging to either an n series (A group) or an nA series (B group).

At Step 100, it is determined whether or not all the centers of the image frames 18B are present in the non-specifying areas. If the answer to this question is affirmative, it suffices if all the frame numbers are uniformly formed into either an n series thereof or an nA series thereof. Accordingly, Step 102 is executed in which the frame numbers are set as numbers forming either an n series or an nA series. This is followed by the termination of the execution of this routine.

If the answer to the question is negative at Step 100, it can be determined that at least one of the centers of the image frames 18B is present within the position specifying area. Therefore, the program proceeds to Step 104 where a determination is made as to whether or not the frame numbers corresponding to the areas in which these centers are present include both numbers forming an n-series and numbers forming an nA series. If it is determined at Step 104 that the frame numbers are not mixed in this way, it can be determined that the stored frame numbers have a certain regularity. Therefore, the state in which they have been stored at first is maintained, then the execution of this routine is terminated. On the other hand, if it is determined at Step 104 that the frame numbers are mixed and include both n-series numbers and nA-series numbers, it can be determined that the stored frame number have no regularity. In this case, Step 106 is executed in which the frame numbers are grouped in such a manner that the n-series frame numbers are grouped into an A group, while the nA-series numbers frame numbers are grouped into a B group. Thereafter, Step 108 is executed in which it is determined whether or not all the frame numbers grouped into either of the above-mentioned two groups correspond to non-specifying areas, with the centers of the relevant image frames being present therein. If the answer is negative, the possibility is determined that there are image frame overlapped during photography. Therefore, the frame numbers are maintained in their original state, then the execution of this routine is terminated. On the other hand, if the answer is affirmative at Step 108, the program proceeds to Step 110 where all the frame numbers corresponding to the non-specifying areas are renewed by adding 1 thereto. If, for instance, the frame numbers 0A, 3A, and 7A in the group B correspond to the relevant non-specifying areas, these frame numbers are renewed to be 1, 4, and 8, respectively.

In the following step 12, all the renewed frame numbers are compared to each other to determine whether or not any of the frame numbers is repeated. Specifically, if the group A comprises 0. 2. 4. 6, 8, ..., it is not preferable to renew the frame numbers of the group B to be 1, 4, and 8, as in the above-stated example, because there are two 4s and two 8s in this case. Accordingly, if the answer is affirmative at Step 112, the program proceeds to Step 114 where the original frame numbers of the group B are renewed by subtracting 1 therefrom. For instance, the group B comprising 0A, 3A, and 7A is renewed to read 0, 3, and 7. In the following step 116, it is determined whether there is any repetition after this renewing. If there is no repetition, the frame numbers resulting from this renewing are set as the finally determined frame numbers. If there is any repetition, it is determined that there is a great deviation in the pitch of the image frames and, consequently, that it is impossible to give any regularity to the frame numbers. In this case, therefore, Step 118 is executed where the frame numbers are used as they remain in their original state.

If the frame numbers are provided with a certain regularity, and then are printed on the reverse surface of the printing paper, this facilitates the selection of the image frames that correspond to these frame numbers. Since a series of pieces of printing papers will be provided with a corresponding regularity, this enables the client to request for reprints without finding the numbers strange.

Although in the foregoing embodiment, the specifying of the image frames is effected during the printing by the printer, the specifying of image frames may be alternatively be effected when notches are formed by a notch puncher in the negative.

As has been described above, the frame number specifying method of the present invention provides the advantageous effect in which the frame numbers of a photographic film can be specified in such a manner as to form a sequence of numbers or a series of symbols that possesses a certain regularity throughout the length of one photographic film.

What is claimed is:

1. A method of specifying each of frame numbers given to image frames of an elongated photographic film when the film is fed to be positioned in a printing position at which the film is to be subjected to printing, comprising the steps of:
   reading frame number information means provided on the photographic film;
   setting position specifying areas at even intervals in the longitudinal direction of the film to include in said areas frame numbers recorded at constant intervals in the longitudinal direction of the film, the frame number within one of said position specifying areas being specified as the frame number of one of the image frames if the center of said one image frame is present in said one position specifying area; and
   setting non-specifying areas which are in the vicinity of the boundaries of said position specifying areas but which do not belong to any of the frame numbers, the frame number of one of said image frames whose center is present within one of said non-specifying areas being specified by referring to the frame numbers of the image frames ahead of and behind said one image frame.

2. A method of specifying a frame number according to claim 1, wherein said frame number information means is read by positional information detecting means as the photographic film is moved.

3. A method of specifying a frame number according to claim 2, wherein said frame number information means corresponds to the frame numbers, the method further including the step of recognizing the frame numbers by means of a controller and on the basis of data resulting from the reading of said frame number information means.

4. A method of specifying a frame number according to claim 3, wherein the process of positioning the photographic film in the printing position is performed by detecting specifying means formed on the photographic film in correspondence with each of the image frames, said specifying means being detected by means of specifying means detecting means.

5. A method of specifying a frame number according to claim 4, wherein the center of one of the image frames is recognized on the basis of the distance which said one frame is moved after said positional information detecting means has read the frame number information means until said one image frame is positioned in the printing position 6. A method of specifying a frame number according to claim 5, wherein the position information means read corresponds to one of the image frames which is in the state of having been moved over a distance corresponding to a predetermined number of image frames.

7. A method of specifying a frame number according to claim 3, wherein when any of said frame number information means is present in any of said non-specifying areas, the frame number is not specified, the frame number information means being regarded as a blank and stored in said controller.

8. A method of specifying a frame number according to claim 7, wherein when all the centers of the image frames are present in said non-specifying ares, all the frame numbers are uniformly specified as either of two predetermined series of numbers.

9. A method of specifying a frame number according to claim 8, wherein when a part of the centers of the image frames are present in areas corresponding to one of a plurality of predetermined series of numbers while the remaining ones are present within areas corresponding to another of said plurality of predetermined series of numbers, the frame numbers are grouped into individual series of numbers.

10. A method of specifying a frame number according to claim 1, wherein the photographic film is a 35 mm film, with the image frames being recorded thereon in full-size, said position specifying areas being set in such a manner as to be compatible with half-size.

* * * * *